United States Patent Office 2,955,979
Patented Oct. 11, 1960

---

2,955,979

APHICIDIAL COMPOSITION

Richard E. Van Strien, Griffith, Ind., assignor to Standard Oil Company, Chicago, Ill., a corporation of Indiana No Drawing. Filed Apr. 15, 1959, Ser. No. 806,439

4 Claims. (Cl. 167—30)

This invention relates to a composition for and a method of controlling sucking insects, particularly aphides.

An object of the invention is a method of controlling sucking insects without doing injury to the host plant. Another object is an insecticidal composition effective against sucking insects and particularly aphides. Other objects will become apparent in the course of the detailed description of the invention.

It has been discovered that sucking insects such as aphides can be controlled by applying to the habitat of these insects a trialkyl trimellitate where each alkyl group contains from 1 to about 20 carbon atoms. The trialkyl trimellitates used as aphicides in the invention have the formula

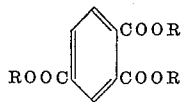

where R is an alkyl group containing from 1 to 20 carbon atoms.

The alkyl groups present in said trimellitate are derived from alkanols containing from 1 to 20 carbon atoms. Examples of suitable alkanols are methanol, ethanol, n-butanol, hexanol, 2-ethylhexanol, tridecanol, octadecanol and dodecanol. The trialkyl trimellitates of the invention may contain only alkyl groups of the same type or may contain alkyl groups of 2 or 3 types, i.e., may be mixed esters.

These defined trialkyl trimellitates are liquids which are soluble in liquid hydrocarbons such as naphtha, benzene, or xylene; and are very soluble in oxygenated type organic solvents such as alcohols and ketones. These esters are such effective aphicides that water solutions of the more soluble ones are obtainable which contain effective amounts of the ester. Where larger amounts of the defined esters are necessary, water dispersions may be readily prepared by the use of conventional surface active agents. The use of water dispersions is particularly suitable where plants have rather delicate constitution with regard to hydrocarbons or oxygenated organic solvents are to be treated.

In addition to the solvents which act as carriers, the defined esters may be adsorbed by inert porous powders such as fuller's earth or finely powdered charcoal to prepare compositions suitable for use as dusting agents.

Thus the defined esters may be used as such in the control of sucking insects or used along with inert insecticidal adjuvant as a carrier to form either a liquid or solid composition which is effective against sucking insects. Commercial sprayers prefer to make up spray compositions by adding the defined ester per se to water containing a surface active agent. To do-it-yourself, or small scale user will prefer to add a mixture of the defined ester and a surface active agent to water or a concentrate consisting of the defined ester dissolved in an oxygenated solvent such as acetone.

*Illustrations*

The insecticidal activity of certain of the defined esters was tested by standard procedures. The test for aphicidal activity was conducted using peach leaves infested with adult aphides. The peach leaves were sprayed with a Pete-Grady gun at about 5 p.s.i.g. air line pressure. The leaves were sprayed to wetting with the particular sample being tested. At the end of 24 hours the number of living and of dead aphides was counted. The effectiveness of the particular composition was determined as percentage of the dead aphides to aphides subjected to the test.

The test solution used in each test consisted of acetone and 0.05 weight percent of the particular ester.

The 3 esters which were tested and the percent kill are set out below.

| Ester: | Percent kill |
|---|---|
| Tri(n-butyl) trimellitate | 90 |
| Di-(n-butyl) decyl trimellitate | 100 |
| Triisooctyl trimellitate | 87 |

The same solutions were tested on cockroaches and house flies and, surprisingly, were found to be ineffective against these particular insects.

Various solutions of these esters were used on vegetation in order to determine herbicidal activity. In no case was there any significant amount of damage to the vegetation. This absence of damage to vegetation is of particular importance to the control of sucking insects since such control requires drenching the infested vegetation with the insecticide.

The insecticidal composition is applied to the habitat which is infested by the sucking insects. Preferably this is applied to the insects on the vegetation itself, however, effective control is also obtained by applying the material to the ground area in which the vegetation is growing.

Thus having described the invention what is claimed is:

1. A method of controlling sucking insects which method comprises applying to a habitat of said insects a trialkyl trimellitate where each alkyl group contains from 1 to about 20 carbon atoms.

2. The method of claim 1 wherein said trimellitate is tri(n-butyl) trimellitate.

3. The method of claim 1 wherein said trimellitate is tri(isooctyl) trimellitate.

4. The method of claim 1 wherein said trimellitate is di(n-butyl) decyl trimellitate.

References Cited in the file of this patent

UNITED STATES PATENTS

| 1,894,604 | Voorhees | Jan. 17, 1933 |
| 2,000,004 | Adams | May 7, 1935 |

OTHER REFERENCES

Chem. Abst., 40, 5312 (9), 1946; 50, 8733(h), 1956.